US006760123B1

(12) United States Patent
Harrington et al.

(10) Patent No.: US 6,760,123 B1
(45) Date of Patent: Jul. 6, 2004

(54) METHOD AND SYSTEM FOR MAPPING COLOR TO TEXTURE IN A COPIER

(75) Inventors: Steven J. Harrington, Webster, NY (US); Jean Taber, Williamson, NY (US); Gwendolyn Hembrock, Redondo Beach, CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/450,860

(22) Filed: Nov. 29, 1999

(51) Int. Cl.[7] .............................................. G06F 15/00
(52) U.S. Cl. ...................................... 358/1.9; 382/164
(58) Field of Search ........................ 358/1.9, 486, 467, 358/448; 382/232, 164, 162

(56) References Cited

U.S. PATENT DOCUMENTS

| | | | | |
|---|---|---|---|---|
| 4,688,031 A | * | 8/1987 | Haggerty | ...................... 340/793 |
| 4,703,318 A | * | 10/1987 | Hagerty | ....................... 346/723 |
| 4,879,595 A | * | 11/1989 | Niki et al. | ................... 358/539 |
| 5,153,576 A | * | 10/1992 | Harrington | ................... 345/596 |
| 5,345,320 A | * | 9/1994 | Hirota | ......................... 358/518 |
| 5,406,366 A | * | 4/1995 | Kusumoto et al. | ............. 399/54 |
| 5,513,007 A | * | 4/1996 | Ito et al. | ....................... 358/296 |
| 5,657,137 A | * | 8/1997 | Perumal et al. | .............. 358/502 |
| 5,701,401 A | * | 12/1997 | Harrington et al. | ........... 358/1.9 |
| 5,740,333 A | * | 4/1998 | Yoh et al. | ...................... 358/1.9 |
| 5,818,966 A | * | 10/1998 | Prasad et al. | .................. 382/232 |
| 5,917,994 A | * | 6/1999 | Perumal et al. | .............. 358/1.9 |
| 5,923,447 A | * | 7/1999 | Yamada | ....................... 358/523 |
| 5,982,924 A | * | 11/1999 | Power et al. | ................. 382/162 |
| 6,091,511 A | * | 7/2000 | Ben Dror et al. | ............. 358/1.9 |
| 6,179,485 B1 | * | 1/2001 | Harrington | ................... 358/1.9 |
| 6,252,580 B1 | * | 6/2001 | Harrington | ................... 345/582 |
| 6,426,802 B1 | * | 7/2002 | Lin | ............................. 358/1.9 |

* cited by examiner

*Primary Examiner*—Mark Wallerson
(74) *Attorney, Agent, or Firm*—Fay, Sharpe, Fagan, Minnich & McKee, LLP

(57) ABSTRACT

Color documents are reproduced in black-and-white in a manner that preserves color information through halftoning. Each image element on a color document is assigned a tag on the basis of its hue angle. The tag associates with that image element a particular halftone cell. The halftone cell has a distinct pattern associated with a pre-selected range of hue angles. The halftone cell is then applied to the luminance component of the image element. The result is a black-and-white image in which different hues appear as different halftone cells having distinct patterns and variations in the luminance are represented by the density of the resulting halftone.

24 Claims, 10 Drawing Sheets

METHOD AND SYSTEM FOR MAPPING COLOR TO TEXTURE IN A COPIER

This application is related to the field of document reproduction, and more generally, to methods and systems for generating a black-and-white copy of a colored document in a manner that preserves color information.

BACKGROUND

The growing presence of color printers in the workplace has resulted in the need to reproduce documents containing colors. Although there exist color copiers to reproduce color documents, such copiers are neither as common, nor as inexpensive to operate, as conventional black-and-white copiers. Hence, despite the availability of color copiers, color documents are frequently reproduced on black-and-white copiers.

When a black-and-white copier reproduces a color image, the colors in the image appear as different shades of gray in the black-and-white copy. Those colors that are lightest are reproduced in light shades of gray, whereas the darker colors are reproduced in darker shades of gray. Stated in terms of the colorimetric representation of color in terms of luminance, saturation, and hue, the luminance of each color is mapped to a grayscale, and both the saturation and hue are ignored.

The practice of mapping luminance to the grayscale produces acceptable copies of images, in which considerable information is carried by the luminance component of the colors.

Such images include landscape photographs, portraits of persons, photographs of animals, and other conventional subjects of photographs. However, there are many colored images, for example bar charts and graphs, that convey information not through luminance but through hue.

These images frequently employ colors that have almost the same luminances but very different hues. As a result, when reproduced in a conventional manner, colors having nearly the same luminance but different hues map to nearly the same shade of gray. Since these types of images rely on hue, rather than luminance, to convey information, the conventional copying process results in considerable loss of information.

One approach to addressing the foregoing difficulty is to map hue to grayscale. Although this results in the preservation of hue information, it does so at the cost of losing all luminance information. What is desirable in the art, therefore, is a method for reproducing a color image in a manner that preserves both luminance and hue and that does so in a manner that is compatible with existing digital copier architecture.

SUMMARY

The system and method of the invention represents the hue of each constituent image element by a distinct halftone pattern and the luminance of that image element by variations in the density of the halftone pattern. In this manner, the method and system of the invention preserves color information in a black-and-white copy of a colored image by using two degrees-of-freedom available as part of the halftoning process to represent two of the three components of a color.

A system for carrying out the method of the invention includes a color responsive device for resolving a colored image into a first color component and a second color component. The color-responsive device is in communication with the tagger that is configured to select a halftone pattern on the basis of the first color component. Both the tagger and the color-responsive device are in communication with a halftoner that varies the density of the selected halftone pattern in response to variations in the second color component.

Because of the manner in which humans perceive color, the first color component is generally selected to be the hue angle, and the second color component is generally selected to be the luminance. However, the system and method of the invention does not depend on what specific color coordinates are represented by each of the first and second color components. For example, the second color component can be the hue angle, and the first color component can be the luminance. Alternatively, the first color component can be a combination of hue and saturation, and the second color component can be luminance.

When an image includes adjacent image elements, both of which are rendered in coarse halftone patterns, the boundary between the two adjacent image elements can become indistinct. Thus, a preferred embodiment also includes an edge detector for identifying a boundary between an image element and an adjoining image element, and an edge enhancer for rendering this boundary in a distinctive pattern. The boundary can be represented by a line separating the image element from the adjoining image element. Where the image element is darker than the adjoining image element, the image enhancer can generate a dark line and a light line adjacent to the dark line in such a way that the dark line is contiguous with the image element and the light line is contiguous with both the dark line and the adjoining image element. Alternatively, the boundary can be rendered by a distinct halftone pattern that is reserved for boundaries between adjoining image elements.

Certain color documents may include pictorial regions, in which most information is carried by luminance, and non-pictorial regions, in which most information is carried by hue. Under these circumstances, it is useful to distinguish between these two types of regions so that the halftoning method of the invention can be applied to the non-pictorial regions, and a conventional halftoning method can be applied to the pictorial regions. For this purpose, the system for carrying out the principles of the invention includes a segmenter for assigning a pictorial tag to the pictorial regions so that the halftone generator can generate a halftone on the basis of the second color component without reference to the first color component when processing the pictorial regions.

These and other features of the invention, together with a preferred embodiment thereof, will be apparent from an inspection of the following detailed description and the accompanying figures in which:

DETAILED DESCRIPTION

Figure 1:
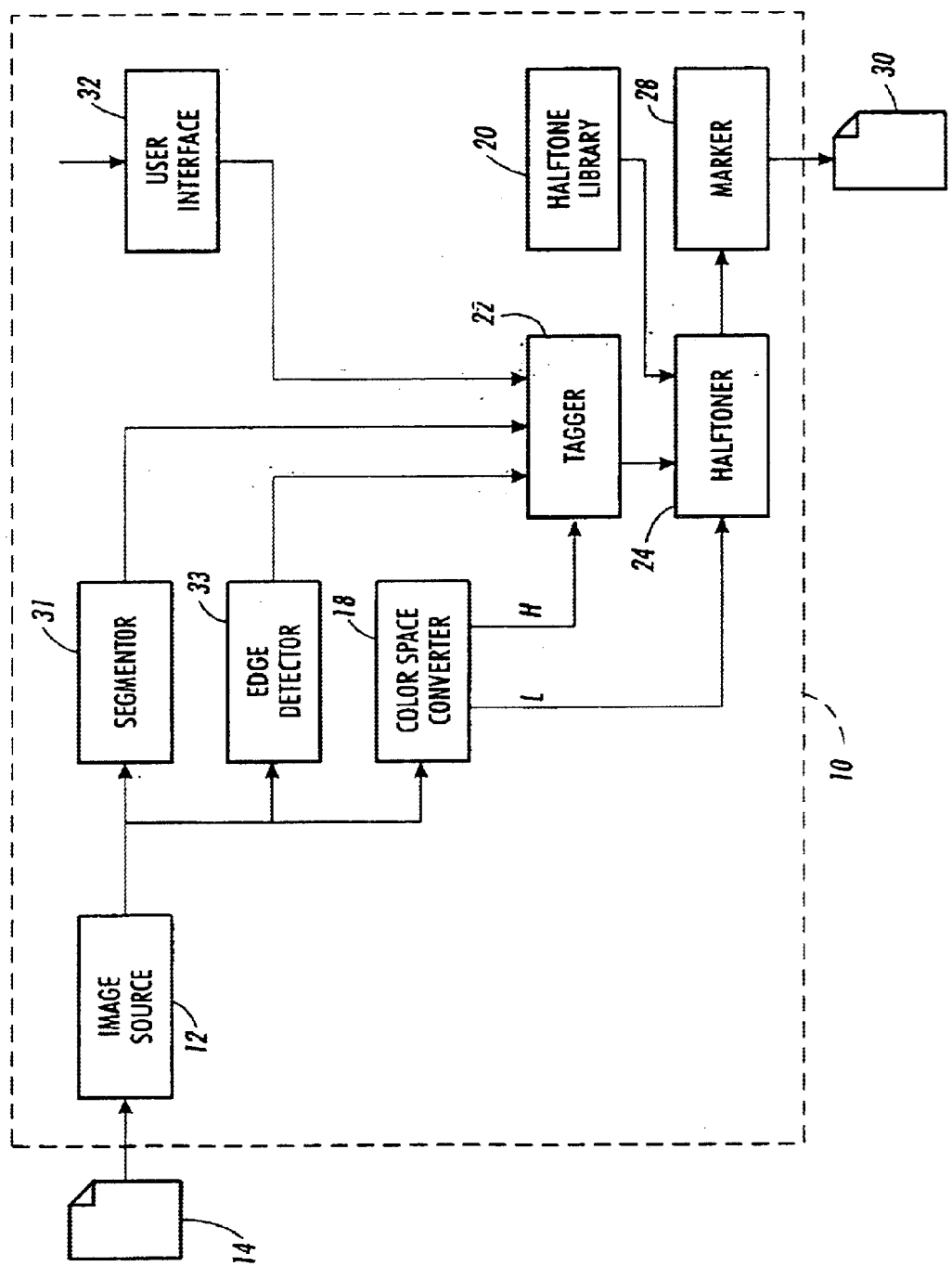
FIG. 1 shows an image reproduction system for carrying out the principles of the invention.

An image reproduction system 10 incorporating the principles of the invention, shown in FIG. 1, includes an image source 12 that obtains a digital representation of the original color document 14. This digital representation is made up of a multiplicity of constituent image elements, each of which is composed of a multiplicity of pixels. A color-space converter 18 or similar color measurement device decomposes each image element into a luminance component L and a hue component H. The color-space converter 18 also generates a saturation component; however, this component is not used in the preferred embodiment.

Figure 2:
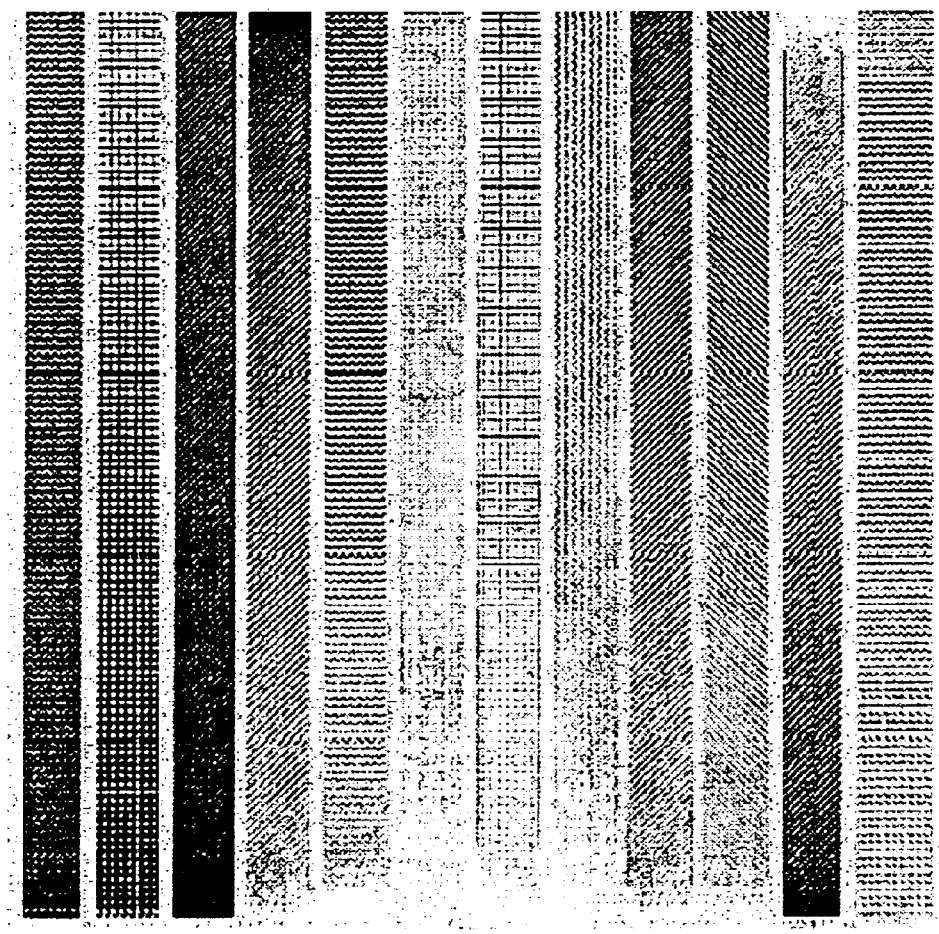
FIG. 2 shows the visual effect achieved by varying the density of twelve different halftone patterns.

The image reproduction system 10 includes a halftone library 20 in which is stored a plurality of distinct halftone cells. Each halftone cell is a grid of numerical thresholds. To apply a halftone cell to the luminance component of an image, the system overlays the halftone cell on the image and, for each grid position in the halftone cell, asks whether the luminance of the pixel that lies under that grid position is greater than the threshold associated with that grid position. If so, that pixel is printed as white; otherwise, that pixel is printed as black. The selection of threshold values and their spatial distribution on the grid can be varied to generate a variety of distinct halftone cells, twelve of which are shown in the twelve strips shown in FIG. 2. In each strip, the luminance varies from a minimum near the left edge of the strip to a maximum near the right edge of the strip. It is apparent from inspection of FIG. 2 that different halftone cells can result in very different visual effects for the same underlying luminance value.

In a system 10 embodying the invention, a tagger 22 in communication with the color space converter 18 associates a particular hue sector with each image element. On a tag associated with that image element, the tagger 22 writes a numerical code identifying the hue sector associated with that image element. The number of different sectors into which the range of hues can be divided is therefore a function of the number of bits available to write this numerical code on the tag. For example, if there are four bits available, there can be as many as sixteen hue sectors. However, in those cases where tags are needed to accomplish other functions, the total number of hue sectors is reduced.

The tag is supplied to the halftoner 24 which selects, from a halftone library 20 a halftone cell, corresponding to the numerical code written on the tag, from a halftone library 20. This selected halftone cell, together with the luminance component L obtained by the color-space converter 18, is used by the halftoner 24 to generate a halftone rendition of the image element. This halftone rendition of the image element is then provided to a marking device 28.

The marking device 28 generates a reproduced document 30 in which the hue components of the colors of the original document 14 are mapped to different halftone cells and the luminance components of the colors in the original document 14 are mapped to different gray levels of the halftone cell.

The system 10 includes an optional user-interface 32 in communication with the tagger 22 for allowing a user to select the halftone patterns that are to correspond to particular hue components, as well as to control other copier functions to be described below.

Because of the distributed nature of modern computing, any combination of the foregoing components can be in communication with other components by means of a network. For example, the printer 28 or the image input stage 12 can be remote from the remaining components and can be connected to those components by means of a network.

Moreover, although the system 10 is illustrated with the image input stage 12 and the printer 28 in direct communication with the image processor 26, this need not be the case. As a data processing device, the image processor 26 only requires input data. It does not matter whether the input data is obtained directly from a hardware device, as illustrated in FIG. 1, or whether the input data is provided in the form of a data file. Similarly, since what the image processor 26 generates is output data, there is no requirement that the data be provided directly to the printer 28 as illustrated in FIG. 1. The output data can just as easily be stored as a file and provided to the printer 28 at a later date.

Figure 3:
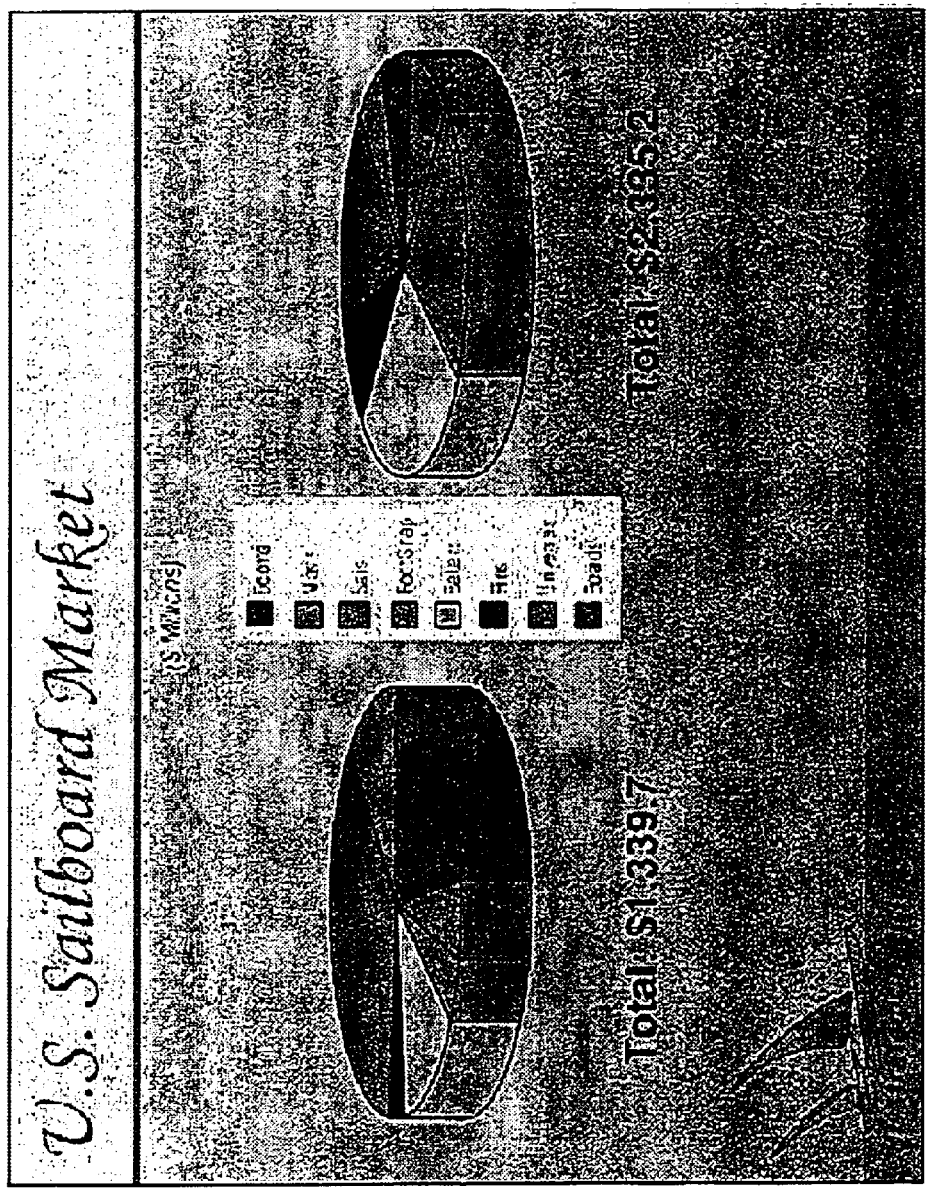
FIG. 3 shows a color image reproduced by a conventional copier.
Figure 4:
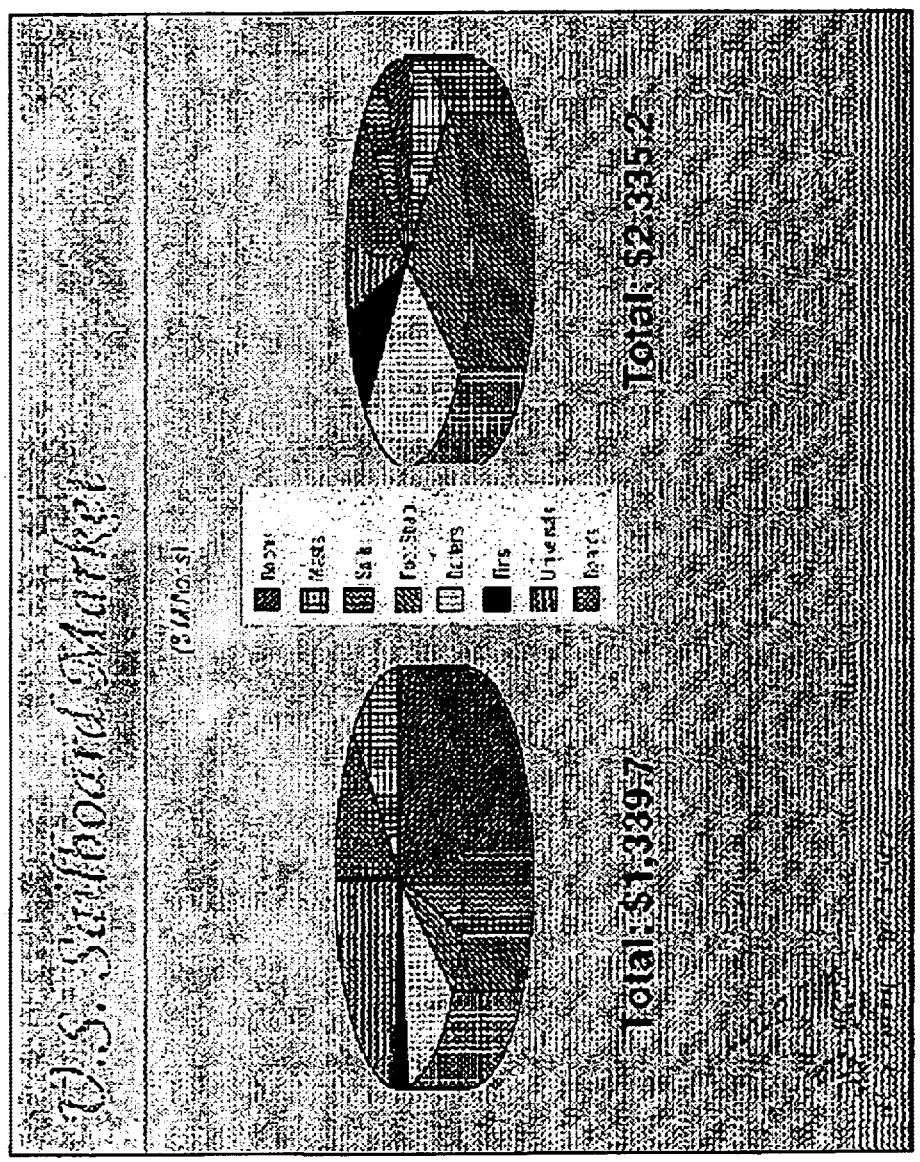
FIG. 4 shows the image of FIG. 3 reproduced by a digital copier incorporating the principles of the invention.

FIGS. 3 and 4 show a colored image after having been photocopied by a conventional copier (FIG. 3) and by a digital copier incorporating the principles of the invention (FIG. 4). Note that it is virtually impossible to discern market share of most sailboard components in FIG. 3. This is because although the colors on each wedge in the piechart have very different hues, they all have virtually the same luminance.

In contrast to FIG. 3, the various wedges of the two piecharts are clearly distinguishable in FIG. 4. In addition, one can now appreciate a pair of sailboards on a colored strip representative of water along the bottom of the image. The smooth transition between a darker colored sky near the bottom of the image and the light colored sky at the top of the image is apparent from the manner in which the halftone pattern representative of the sky color gradually dissolves into white as one traverses the image from the bottom to the top.

It is apparent from an examination of the text under the sailboards in the lower left of the image of FIG. 4 that the use of coarse patterns for the rendering of colored lines and characters disrupts their edges. This makes the lines difficult to detect and the characters difficult to read. These difficulties are further exacerbated when a coarse pattern is superimposed on another coarse pattern, as is the case in the lower left corner of FIG. 4.

The foregoing difficulties involving the use of coarse patterns can be remedied, to a great extent, by outlining the edges of image elements having different hues with black and white lines. Preferably, a black line is drawn on the darker side of the edge and a white line is drawn on the lighter side of the edge so as to enhance the boundary between the two patterns. Alternatively, one can render the edge with a conventional halftone. However, although the use of a halftone rather than a line may be aesthetically more attractive, it is not as effective in sharply defining an edge.

An optional edge detector 33, shown in FIG. 1, can readily detect an edge by well-known image processing techniques such as by identifying abrupt shifts in luminance values between neighboring image elements. The edge detector 33 can then instruct the tagger 22 to apply an edge tag to the image element. This edge tag can then be assigned a distinctive halftone cell from the halftone library 20. By proper choice of the thresholds and grid position, the halftone cell designated for image elements having an edge tag can be selected to form black and white lines as described above. Alternatively, the light side of the edge is tagged for rendering in a halftone that produces white and the dark side of the edge is tagged for rendering in a halftone that produces black.

Figure 5:
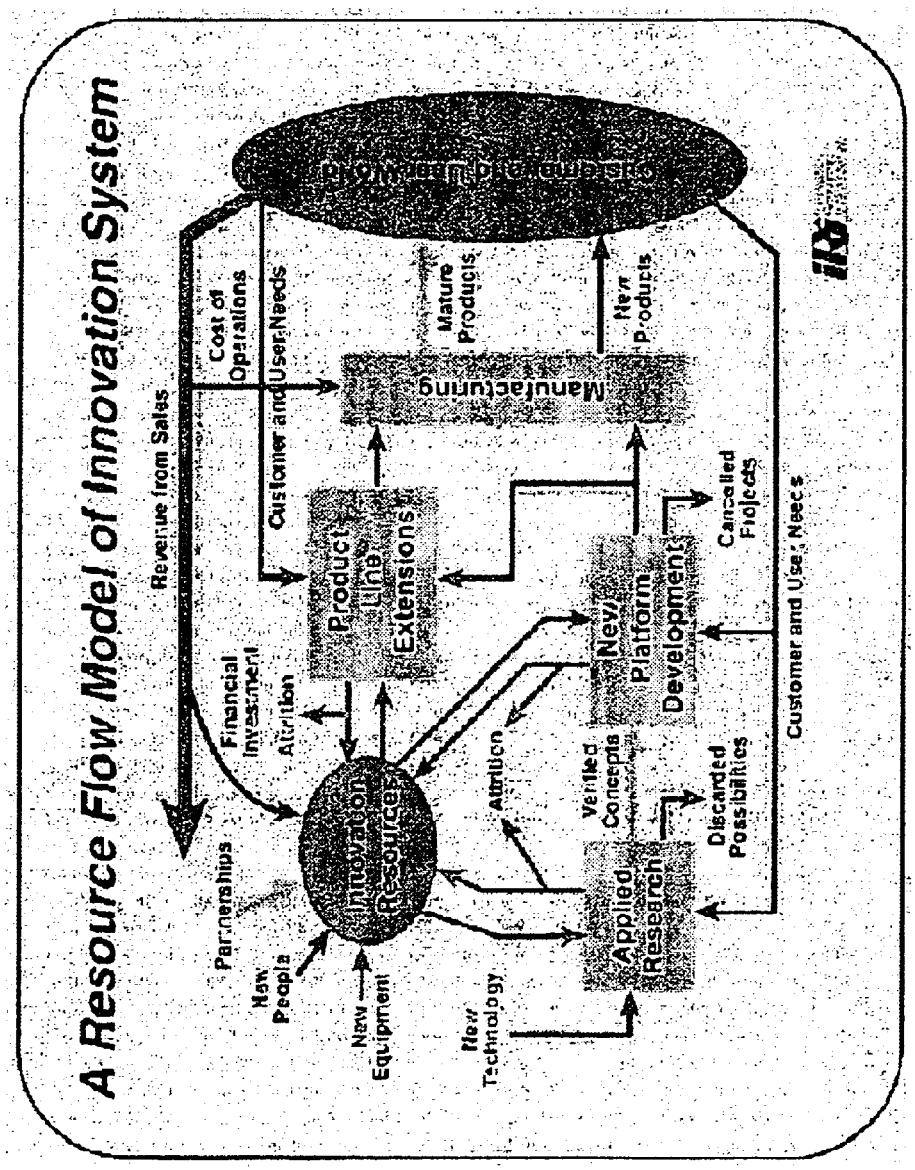
FIG. 5 shows an image having a colored text and thin colored lines as reproduced by a conventional copier.
Figure 6:
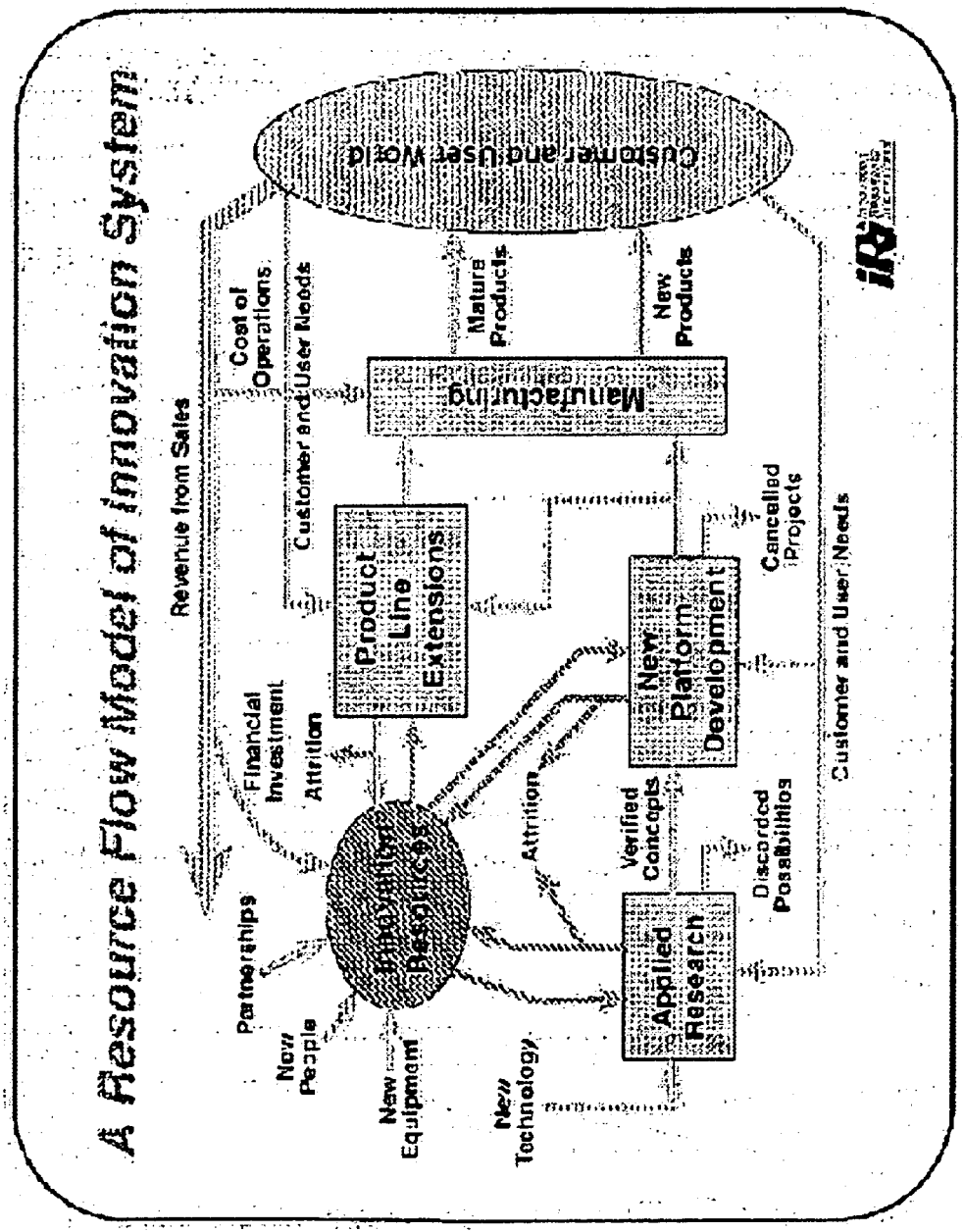
FIG. 6 shows the image of FIG. 5 reproduced by a copier incorporating an edge enhancement mechanism present in a preferred embodiment of the invention.

The effect of the outlining feature is apparent from comparing FIGS. 5 and 6. Once again, FIG. 5 is a reproduction of a color document on a conventional copier, whereas FIG. 6 is the same color document reproduced on a digital copier embodying the edge enhancement feature of the invention. Note in particular how the edge enhancement feature of the invention improves the visibility of thin lines and arrows in FIG. 6.

The optional segmenter 31 of FIG. 1 segments the image into pictorial and non-pictorial regions by well-known image segmentation techniques such as looking at the color variance and volume of color space in the neighborhood of the image element. The segmenter 31 can then instruct the tagger 22 to apply a pictorial tag to the image element. The pictorial tags can then be assigned to a halftone cell designated for superior rendition of pictorial images.

Although any halftone cell can be used to represent a particular hue sector, it is aesthetically preferable to choose the halftone cells such that adjacent hue sectors have a similar appearance. This is most readily accomplished by configuring the tagger 22 to select the halftone cell for a particular hue sector on the basis of the halftone cells associated with the particular hue sector's neighboring hue sectors. The results of selecting the halftone cell in this manner is a smooth transition between portions of an image having adjacent hue sectors. This results in smoother transitions when copying an image having rainbow sweeps of color, such as the strip along the upper edge of FIG. 7. Note that the halftone patterns used to render the strip in FIG. 7 are selected to minimize abrupt transitions between patterns, thereby creating a perception of continuity that is consistent with the continuum of color present in the original colored document.

Figure 7:
FIG. 7 shows an image having a continuous rainbow sweep of color and a photographic image.

The perception of continuity in the black-and-white rendition of the rainbow sweep of FIG. 7 is achieved, in the present invention, by overlapping halftone cells of adjacent colors. For example, in the preferred embodiment, twelve halftone cells are used to represent twelve hue sectors. Six of these halftone cells correspond to hue sectors containing the three primary colors (cyan, magenta, and yellow) and the three secondary colors (red, green, and blue). The remaining six halftone cells are built by combining neighboring halftone cells. For example, the halftone cell used to represent the hue sector containing orange is formed by combining the halftone cell used to represent the hue sector containing red and the hue sector containing yellow. Similarly, the halftone cell for the hue sector containing purple is formed by combining the halftone cells for the hue sector containing blue and the hue sector containing magenta.

A digital copier incorporating the invention can also be programmed to enhance distinctions between colors, in which case halftone cells for adjacent hue sectors are deliberately made as different as possible. In addition, the digital copier can implement software allowing a user to select what pattern to apply to a hue sector or to specify the angular extents of one or more hue sectors. This can be achieved by having the user point to a color on the source image and then presenting the user with a palette of patterns to correspond to that color.

Although the preferred embodiment is described in terms of mapping hue angle to halftone cells and then halftoning on the basis of hue, the broader concept of the invention includes the representation of a first color component by distinct halftone cells and the representation of a second color component by variations in the density of the halftone. Although the selection of hue angle and luminance as described herein is a natural choice given the characteristics of human visual perception, the invention also includes the converse case in which halftone cells are selected on the basis of luminance and halftoning is preferred on the basis of hue angle. Alternatively, the system can be configured such that the first color component includes a saturation component as well as a hue angle. In this case, a halftone pattern might correspond to an irregularly shaped volume in the color space rather than a wedge-shaped prism, as is the case in the preferred embodiment. In yet another embodiment, a halftone pattern is reserved for near neutral colors, regardless of their hue.

When applied to a photograph, the mapping of hue angle to halftone patterns can have aesthetically undesirable results. For example, the photograph in FIG. 7 has an excessively mottled appearance resulting from the use of coarse halftones to represent certain colors. This can be remedied by dedicating one tag to correspond to conventional halftoning on the basis of luminance and to apply that tag to those portions of the document that contain photographs. In such a case, an image segmentation mechanism can be used to enable the tagger 22 to determine what portions of the original document are pictures. One method for implementing an image segmentation mechanism is to allow the user to designate such portions via the user interface 32. This is shown in FIG. 1 by having the user-interface 32 communicate with the tagger 22.

Figure 8:
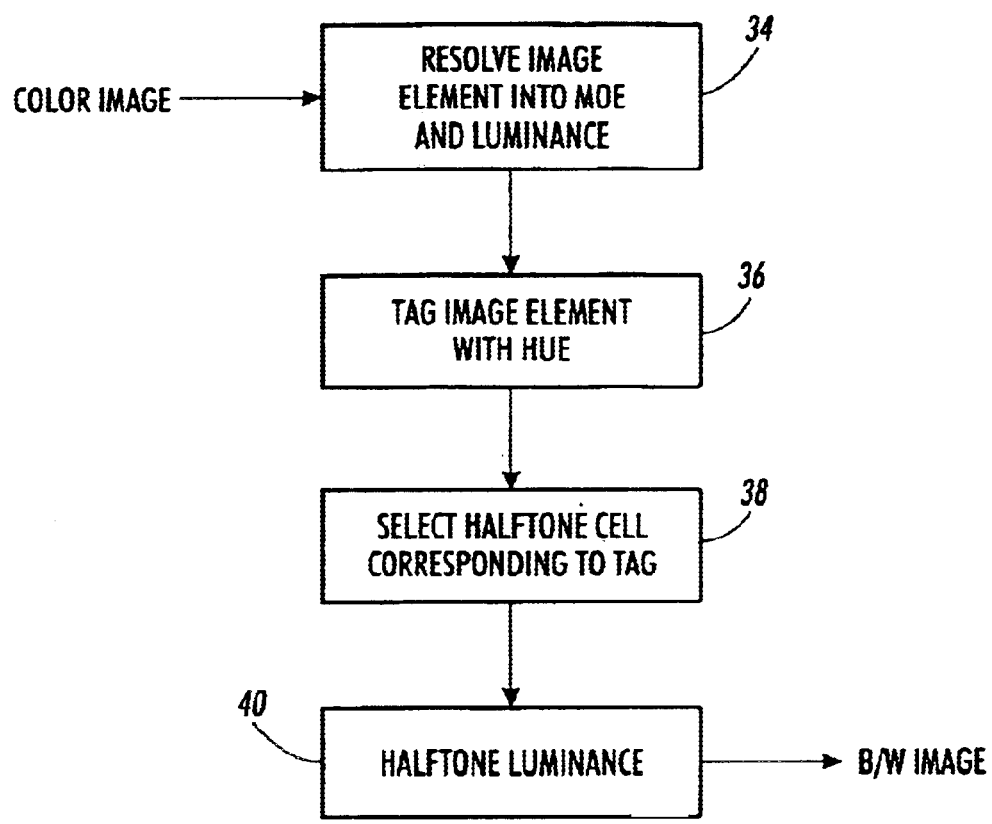
FIG. 8 is a flow chart illustrating the operation of the image reproduction system of FIG. 1 in accordance with teachings of the present invention.

FIG. 8 is a flow chart illustrating the operation of the image reproduction system 10 according to the teachings of the present invention. The color of a constituent image element of a color image is first resolved into hue and luminance components (step 34) and tagged with its hue (step 36). This is followed by the selection or generation of the halftone cell corresponding to the hue listed on the tag (step 38). The luminance component associated with that image element is then halftoned using the selected halftone cell (step 40).

Figure 9:
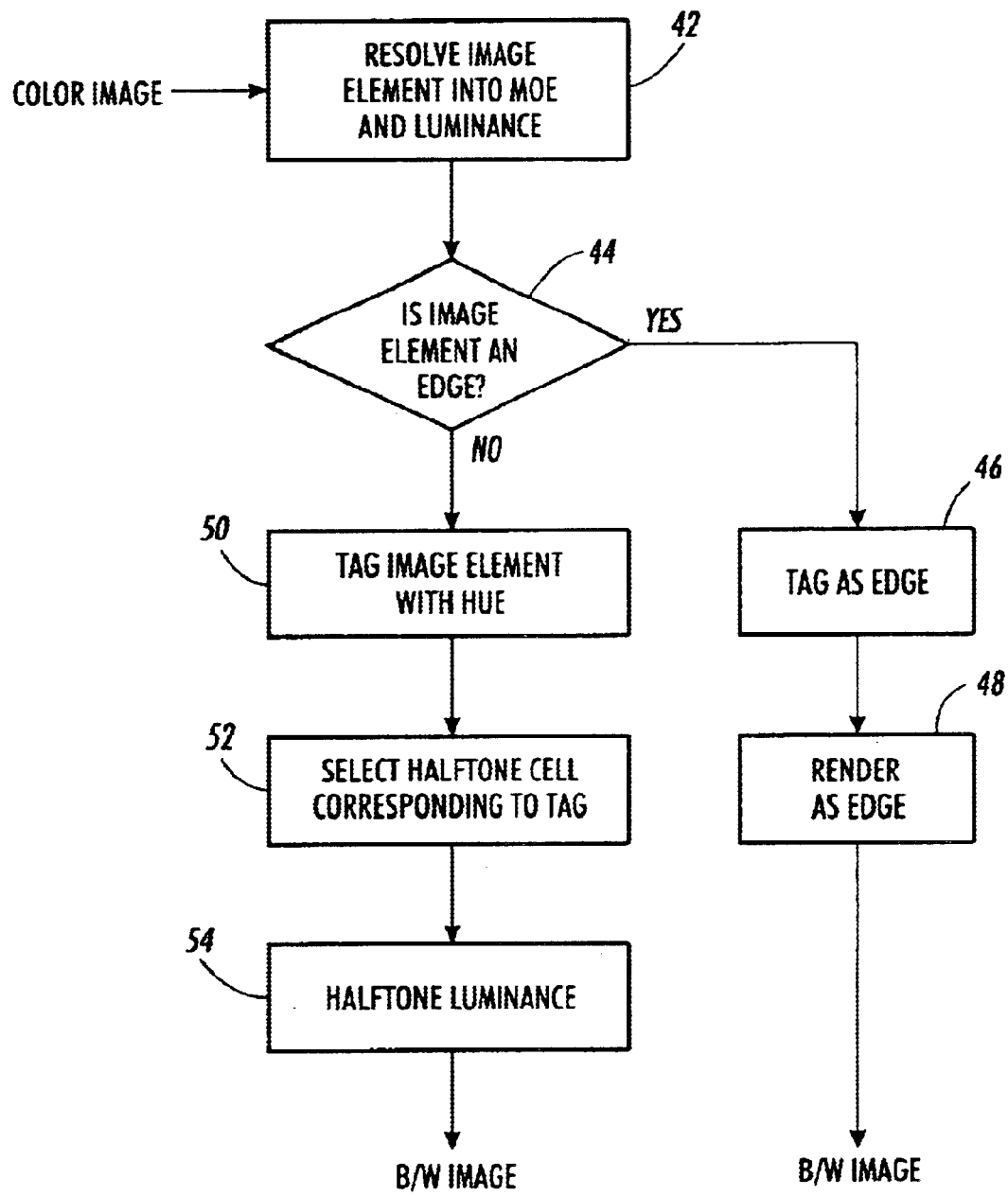
FIG. 9 is a flow chart illustrating the operation of the optional edge enhancement feature of the present invention.

FIG. 9 is a flow chart illustrating the operation of the image reproduction system 10 when employing the optional edge enhancement feature of the present invention. As was the case in FIG. 8, the color of the image element is first resolved into hue and luminance components (step 42). On the basis of this information, the system determines whether the image element is an edge element or an interior element (step 44). If the image element is an edge element, the image element is tagged as an edge (step 46). Such an image element is then rendered as an edge by using a halftone cell designated especially for edges (step 48). Alternatively, the system 10 can alter the image data along the edge so as to produce black and white lines along the edge. If the image element is an interior image element, the image element is tagged with its hue information (step 50) and processed in the manner discussed in connection with FIG. 8. The halftone cell corresponding to the hue listed on the tag is selected (step 52) and the luminance component associated with that image element is halftoned to vary the density of the halftone cell (step 54).

Figure 10:
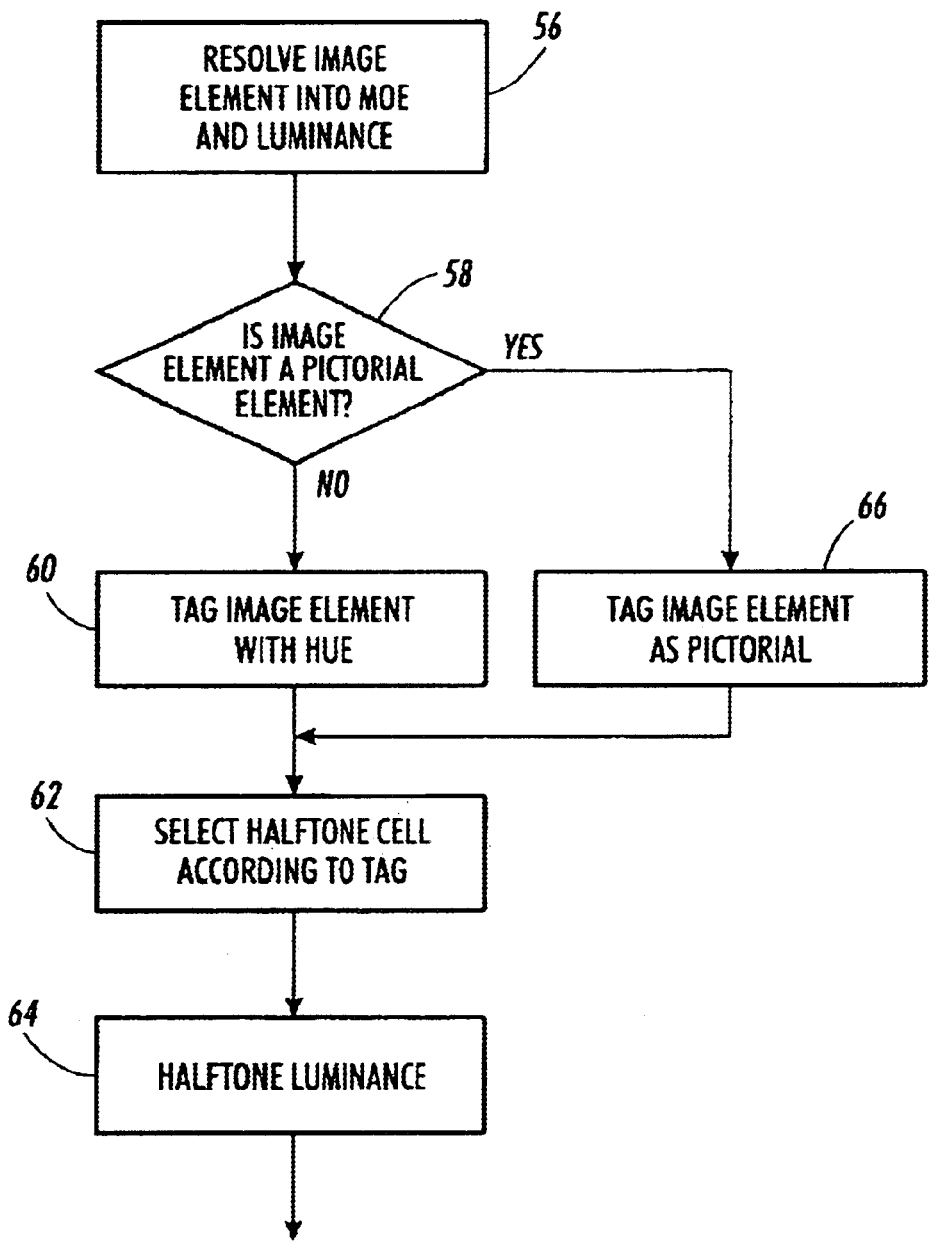
FIG. 10 is a flow chart illustrating the operation of the optional pictorial image feature of the present invention.

FIG. 10 shows the steps to be carried out when the method of the invention includes the optional feature of processing pictorial sections of the image to be reproduced differently from other image elements. These pictorial sections are, for example, color photographs in which the use of halftone cells corresponding to different colors would result in an unattractive reproduction of the photograph. These pictorial sections can be identified by either having a user designate certain sections of the image as pictorial sections or by using image segmentation techniques known in the art.

The method of FIG. 10 begins with the steps of resolving the color an image element into hue and luminance (step 56) and then determining whether the image element is a pictorial element (step 58). If the image element is not a pictorial element, processing proceeds as described in connection with FIG. 8. The image element is tagged with its hue (step 60) and the halftone cell corresponding to the hue listed on the tag is then selected (step 62). The luminance component associated with that image element is then halftoned to vary the density of the halftone cell (step 64). If, on the other hand, the image element is a pictorial element, then it is tagged as a pictorial element (step 66). A halftone cell suitable for pictorial elements is then selected (step 62). Using this halftone cell, the pictorial element is then halftoned on the basis of its luminance component (step 64) without regard to its hue.

It will thus be seen that the invention efficiently attains the objects set forth above. Since certain changes may be made in the above constructions without departing from the scope of the invention, it is intended that all matter contained in the above description or shown in the accompanying drawings be interpreted as illustrative and not in a limiting sense.

It is also to be understood that the following claims are intended to cover all generic and specific features of the invention described herein, and all statements of the scope of the invention which as a matter of language might be said to fall there between. Having described the invention, what is claimed as new and secured by Letters Patent is:

What is claimed is:

1. An image reproduction system for generating a monochromatic representation of a colored image having an image element with first and second color attributes, said image reproduction system comprising:
   a tagger in communication with a color responsive device, said tagger configured to generate a tag containing data identifying at least the first color attribute for selection of a halftone pattern from a halftone library on the basis of said first color attribute; and
   a halftoner in communication with said tagger and said color responsive device, said halftoner being configured to halftone said colored image on the basis of said halftone pattern and said second color attribute, said halftone having a pattern representative of the first color attribute and a halftone density representative of the second color attribute.

2. The system of claim 1 wherein said colored image includes a neighboring image element adjacent to said image element, and said system further comprises:
   an edge detector responsive to said colored image and adapted to identify a boundary between said image element and said neighboring image element, and
   an edge enhancer in communication with said edge detector for rendering said boundary in a distinctive pattern.

3. The system of claim 2 wherein said edge enhancer comprises means for generating a line along said boundary between said image element and said neighboring image element.

4. The system of claim 3 wherein said image element is darker than said neighboring image element and said line generating means comprises:
   means for generating a dark line contiguous with said image element, and
   means for generating a light line continuous with said dark line and said neighboring image element.

5. The system of claim 1 wherein said colored image includes a neighboring image element adjacent to said image element and said tagger comprises:
   an edge detector for detecting a boundary between said image element and said neighboring image element, and
   means for associating a distinct halftone pattern with said boundary.

6. The system of claim 1 wherein said colored image includes a pictorial region and a nonpictorial region and said tagger comprises means for assigning a pictorial tag to said pictorial region.

7. An image reproduction system for generating a monochromatic representation of a colored image including a pictorial region and a nonpictorial region having first and second color components, said system including:
   a tagger in communication with a color responsive device, said tagger configured to generate a tag containing data identifying at least the first color attribute for selection of a halftone pattern, from a halftone library for said nonpictorial region on a basis of said first color component and assign a pictorial tag to said pictorial region; and
   a halftoner in communication with said tagger and said color responsive device, said halftoner being configured to halftone said nonpictorial region on the basis of said halftone pattern and said second color component and said pictorial region on the basis of said second color component without reference to said first color component.

8. The system of claim 1 further comprising a user interface in communication with said tagger for enabling a user to select a halftone pattern to correspond to selected values of said first color attribute.

9. The system of claim 1 wherein said tagger is configured to select a halftone pattern on the basis of neighboring values of said first color attribute.

10. The system of claim 1 wherein said color responsive device comprises means for selecting said first color attribute to be a hue and said second color attribute to be a luminance.

11. The system of claim 1 wherein said first color attribute is selected to be luminance and said second color attribute is selected to be hue.

12. The system of claim 1 wherein said second color attribute is selected to be luminance and said first color attribute is selected to be a combination of hue and saturation.

13. A method for generating a monochromatic representation of a colored image having an image element, said method comprising the steps of:
   resolving said image element into a first color attribute and a second color attribute;
   associating with said image element a tag, generated by a tagger, encoding said first color attribute,
   selecting a halftone pattern, from a halftone library, on the basis of said tag, said halftone pattern being representative of said first color attribute; and
   varying the density of said halftone pattern on the basis of said second color attribute.

14. The method of claim 13 wherein said colored image includes a neighboring image element adjacent to said image element, and said method further comprises the steps of:

identifying a boundary between said image element and said neighboring image element, and rendering said boundary in a distinctive pattern.

15. The method of claim 14 further comprising the step of generating a line along said boundary between said image element and said neighboring image element.

16. The method of claim 15 wherein said image element is darker than said neighboring image element and line generating step further comprises the steps of:

generating a dark line contiguous with said image element, and generating a light line continuous with said dark line and said neighboring image element.

17. The method of claim 13 wherein said colored image includes a neighboring image element adjacent to said image element and said method further comprises the steps of:

detecting a boundary between said image element and said neighboring image element, and associating a distinct halftone pattern with said boundary.

18. The method of claim 13 wherein said colored image includes a pictorial region and a nonpictorial region and said method further comprises the step of assigning a pictorial tag to said pictorial region.

19. The method of claim 18 further comprising the step of generating a halftone for the pictorial region on the basis of said second color attribute without reference to said first color attribute.

20. The method of claim 13 further comprising the step of providing a user interface for enabling a user to select a halftone pattern to correspond to selected values of said first color attribute.

21. The method of claim 13 wherein said step of selecting a halftone pattern further comprises the step of selecting said halftone pattern on the basis of neighboring values of said first color attribute.

22. The method of claim 13 further comprising the steps of selecting said first color attribute to be a hue and selecting said second color attribute to be a luminance.

23. The method of claim 13 further comprising the step of selecting said first color attribute to be luminance and selecting said second color attribute to be hue.

24. The method of claim 13 further comprising the steps of selecting said second color attribute to be luminance and selecting said first color attribute to be a combination of hue and saturation.

* * * * *